United States Patent [19]

George et al.

[11] 3,839,734

[45] Oct. 1, 1974

[54] AIR TURBULENCE UTILIZED TO CLEAR DISC

[75] Inventors: Ian Charles George, near Winchester; Norman William Luland, Winchester, both of England

[73] Assignee: International Business Machine Corporation, Armonk, N.Y.

[22] Filed: Aug. 27, 1973

[21] Appl. No.: 391,105

[52] U.S. Cl. .................................. 360/102, 360/137

[51] Int. Cl. .............................................. G11b 1/00

[58] Field of Search ......... 360/102, 103, 86, 97, 98, 360/132, 137

[56] References Cited

UNITED STATES PATENTS 3,005,675 10/1961 Ledin et al.......................... 360/102

*Primary Examiner*—Vincent P. Canney

[57] ABSTRACT

In a data storage apparatus having a housing and an information storage member in the form of a magnetizable disk within the housing, the disk being so rotatable within the housing as to entrain air to flow therewith, the improvement characterized in having an air deflector blade mounted within the housing, the deflector blade being operable so as to intercept the path of air entrained by the disk as to create a region of turbulence in the air downstream of the deflector blade and to deflect air incident against the deflector blade to pass between the deflector blade and the disk surface into the turbulent region.

11 Claims, 7 Drawing Figures

AIR TURBULENCE UTILIZED TO CLEAR DISC

FIELD OF THE INVENTION

Magnetic disk cartridges characterized by utilizing the air flow generated by motion of the disk during use for maintaining the cleanliness of the disk surface.

BACKGROUND OF THE INVENTION

In reading from or writing on the surface of a magnetizable disk it has become established practice to employ a transducer which flies closely adjacent to the disk surface. The transducer is spaced from the disk surface by the air stream which is entrained by the disk. It has become of prime importance in operating a flying transducer to ensure that the disk surface with which it cooperates is free of contaminating particles since such particles might lead to the transducer crashing against the disk surface with a consequent loss of data.

Brushes have been used to sweep over the surfaces of disks used in disk storage apparatus to brush contaminating particles into the air stream entrained by the disks, the air stream being recirculated and filtered to remove the particles.

Such brushes wear, however, and must be periodically inspected or replaced to maintain their efficiency.

Thus, an object of this invention is to utilize the air flow about the moving disk for cleaning of the disk surface. Another object to provide means for directing the air flow about the disk cartridge without otherwise affecting the operation of the cartridge, utilizing air deflector means incorporated into the cartridge housing itself.

SUMMARY OF THE INVENTION

According to the present invention a data storage apparatus has a housing and an information storage member in the form of a magnetizable disk within the housing, the disk being so rotatable within the housing as to entrain air to flow therewith, the improvement characterized by an air deflector blade mounted within the housing, the deflector blade being operable so to intercept the path of air entrained by the disk as to create a region of turbulence in the air downstream of the deflector blade and to deflect air incident against the deflector blade to pass between the deflector blade and the disk surface into the turbulent region.

The invention will now be described, by way of examples, with reference to the accompanying drawings in which:

IN THE DRAWINGS

Figure 1:
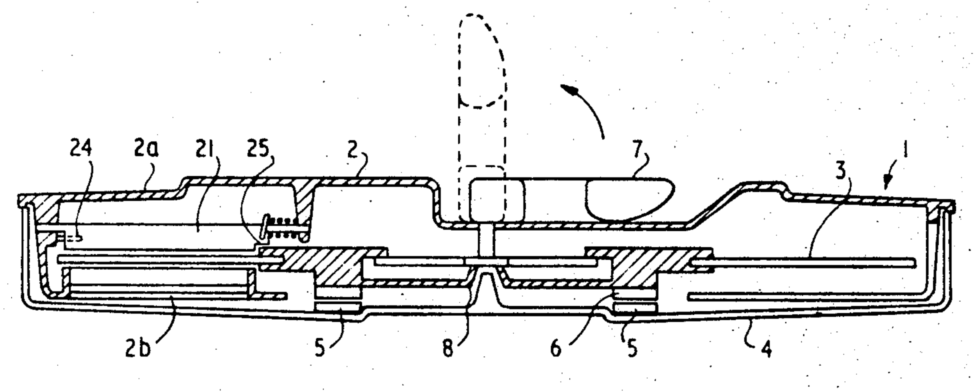
FIG. 1 shows in cross-section a disk cartridge embodying the present invention.
Figure 2:
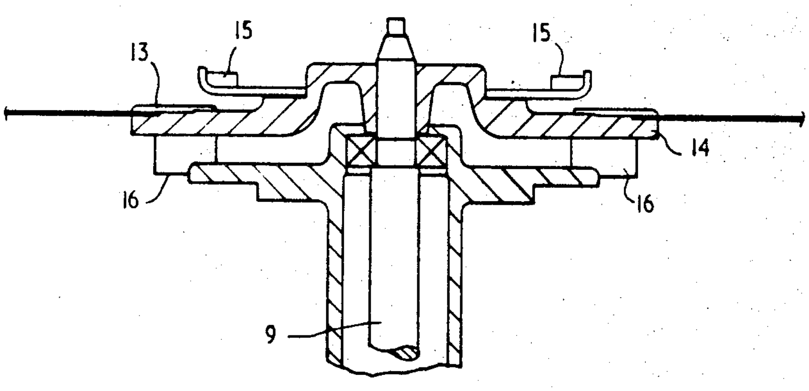
FIG. 2 is a view in cross-section of a part of a disk storage apparatus embodying the present invention and cooperable with the cartridge of FIG. 1 to drive a disk within the cartridge of FIG. 1.
Figure 3:
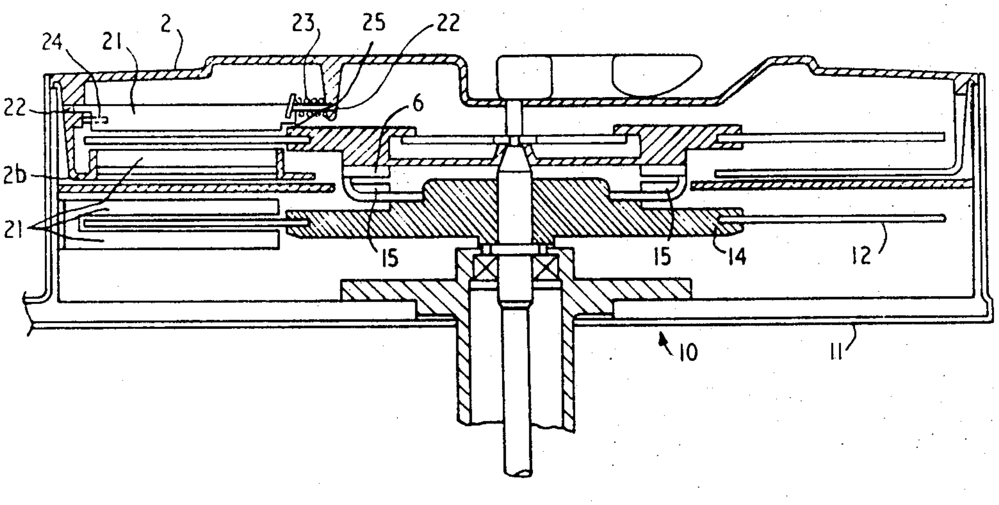
FIG. 3 is a view in cross-section of the disk cartridge of FIG. 1 mounted on the disk storage apparatus of FIG. 2.
Figure 4A:
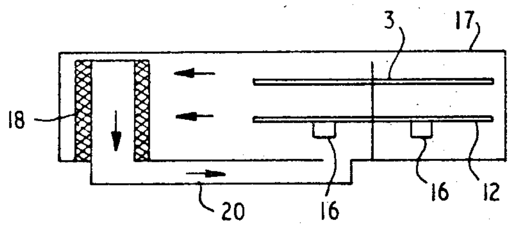
Figure 4B:
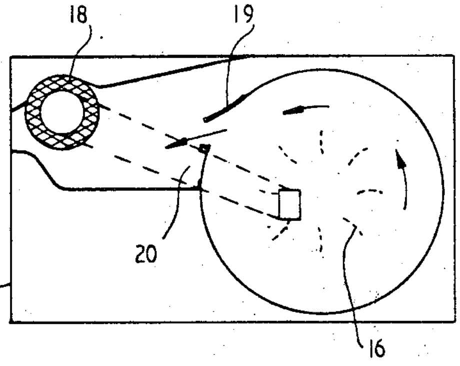
Figure 5:
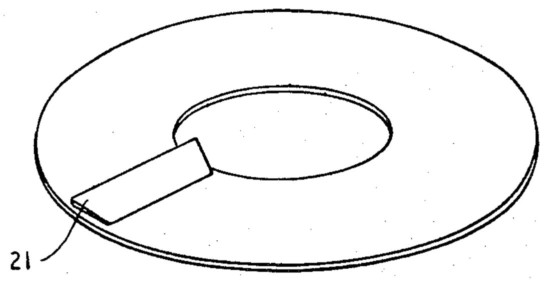
Figure 6:
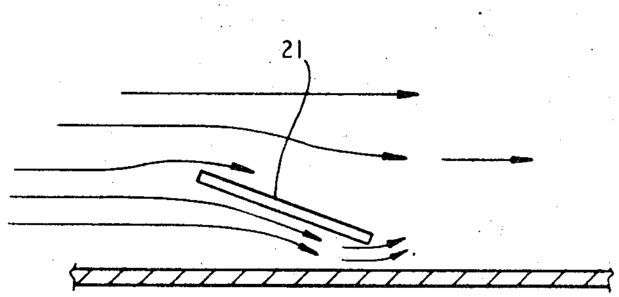

FIG. 4*a* and 4*b* are schematic views of an air circulation path in the disk cartridge and disk storage apparatus of FIGS. 1 and 2 when mounted together as shown in FIG. 3; and FIGS. 5 and 6 show a deflector blade included in the apparatus of FIG. 1.

GENERAL DESCRIPTON

Referring firstly to FIG. 1, the disk cartridge 1 shown is of the general construction and arrangement of the disk cartridge shown and described in our UK Pat. No. 1200572, also issued as U.S. Pat. No. 3,635,608. As described in those patents, the cartridge 1 has a top cover 2 enclosing a magnetic disk 3 and a base or bottom cover 4 surrounding the lower part of the top cover 2. The top cover 2 and bottom cover 4 are held together by four magnets 5 (2 only of which can be seen in FIG. 1) moulded into the bottom cover 4 and spaced at 90° intervals around the central axis of the cartridge and which attract an armature 6 attached to the disk 3. The cover 2 is in the form of a moulding 2*a* having a top and a side portion and a bottom plate 2*b*.

The top cover has a well within which is situated a handle 7 which can be raised from the lowered position shown in full lines to the raised position shown in dotted lines as shown by the arrow to be used in carrying the cartridge 1. The handle also incorporates a latch more fully described in those patents which, when operated, causes the raising of the handle 7 to lift the disk 3 from the magnets 5 so as to release the bottom cover 4 from the cartridge. When released from the cartridge the bottom cover 4 can be removed while the magnetic disk remains within the top cover 2. With the bottom cover removed, a tapered central portion 8 of the disk 3 can be offered to be driven by a drive spindle 9 of complementary shape shown in FIG. 2.

The drive spindle 9 forms part of a disk storage device 10 adapted to receive the cartridge 1 (with the bottom cover removed) as shown in FIG. 3. The disk storage device incorporates, in addition to the spindle 9, a base 11 which carries the spindle 9 and onto which the top cover 2 of the cartridge 1 is placed.

The disk storage device 10 incorporates a magnetic storage disk 12 clamped by means of a clamp ring 13 (FIG. 2) to a hub assembly 14 mounted on the drive spindle 9. The hub assembly 14 incorporates magnets 15 which attract the armature 6 on the disk 3 so as to hold the disk 3 to the drive spindle 9 in a position overlying the disk 12 as shown in FIG. 3.

In order to write information onto the disks 3 and 12 and to read information from the disks 3 and 12, magnetic transducers (not shown) are applied to both surfaces of each of the disks. The heads are of conventional construction.

The rotation of the disks 3 and 12 by means of the drive spindle 9 results in air being entrained by the disks and being caused to circulate with the disks. The circulation of air is aided by impeller blades 16 which depend from the hub assembly 14. As shown schematically in FIGS. 4*a* and 4*b*, the disk storage device 10 and cartridge 13 mounted thereon are received within an outerhousing 17 in which is disposed a filter 18. The filter 18 accepts air circulated by the disks 3 and 12 and directed to the filter by a directing plate 19 within the housing. The filter leads to a return duct 20 which returns the air to a position beneath the impeller blades 16. The air flow within the outer housing 17 follows the paths shown by the arrows in FIGS. 4*a* and 4*b*.

The magnetic transducers already alluded to for writing onto or reading from the disks 3 and 12 are of the type which operate by flying close to the surfaces of the disks and rely on the flow of circulating air entrained by the disks and the impeller blades 16 to keep the transducers spaced from the surfaces of the disks 3 and 12. Contaminating particles on the surfaces of the disks 3 and 12 and within the air circulating about the disks are liable to cause the transducers to crash against the disk surfaces. Such head crashes are not only damaging to the disks and transducers but lead to loss of stored data. It is the purpose of the filter 18 to remove contaminating particles from the air which passes through the filter.

In its passage over the disk surfaces it has been found that the air forms a boundary layer on each of the disk surfaces and contaminating particles on any of the disk surfaces within the boundary layer remains undisturbed by the air flow. It has therefore previously been the practice to use brushes for sweeping over the disk surfaces in order to disturb particles on the disk surfaces and lift them to be carried away by the air flow to the filter 18.

It has now been found that the brushes previously used for brushing the disks 3 and 12 can be replaced by air deflector blades 21 which deflect the air circulating with the disks to dislodge particles from the disk surfaces. The disk storage device 10 incorporates at least two of the deflector blades 21 fixed in position within the base 11 as shown in FIG. 3. The cartridge 1 also incorporates at least two of the deflector blades 21, the lower one of the blades 21 in the cartridge 1 preferably being fixed to the bottom plate 2*b* of the top cover 2 while the top blade 21 in the cartridge 1 is preferably pivotally secured to the top cover 2 on pivot stub axles 22. The pivoted blade 21 is urged by a tension spring 23 to turn until it reaches a working position as defined by a stop 24 secured to the top cover 2. The reasons why the top blade 21 is pivoted in this way is to allow the blade to move so as to be out of the way of the disk 3 when the disk 3 is raised by the handle 7. The movement of the pivoted blade 21 is achieved by means of a follower portion 25 of the blade engaged by the central hub portion of the disk 3. When in its operative position, the pivoted blade 21 acts to deflect air onto the upper surface of the disk 3 in the same manner that the other blades 21 deflect air onto the other disk surfaces. Of course, in other cartridge configurations, as where the disk remains in a fixed position, the movable deflector blade is not needed. Similarly, such blades can be inserted between a stack of disks as in the well known disk pack configuration (i.e. IBM 2314, 3336) for similar cleaning effects. These deflector blades are operable with fixed files, such as the original IBM RAMAC 305 as well as newer configurations. It is also evident that the cleaning effect is not limited to magnetic disks files, but to any rotating storage member. Such storage members include optical file disks in which information is stored as the presence or absence of an opaque or reflective material, for example. Optical read/write means are used with such files. Other configurations are known to those skilled in the art.

FIGS. 5 and 6 show one of the blades 21 in operative relation to one of the disks. It can be observed from FIGS. 5 and 6 that each blade 21 is inclined to the disk surface with which the blade cooperates and, as shown more clearly in FIGS. 3 and 6, each blade 21 is spaced from the disk surface with which it cooperates. The air incident against each deflector blade is deflected against the disk surface with which the blade cooperates and passes between the deflector blade and the disk surface to sweep away particles from the disk surface.

The deflector blades 21 are shaped to cause air passing over the blades to separate from the blades and so cause low pressure turbulence in the air downstream of the blades 21. As a result the air which passes between each blade 21 and the surface with which it cooperates sweeps particles from the disk surface into the low pressure turbulent region downstream of the blade 21.

The velocity of the air circulating with the disks varies along the radius of each disk. Thus for a given angular velocity $w$ of the disks, the velocity of the air circulating at any point of the disks varies in accordance with $rw$ where $r$ is the radial distance of the point in question. In order to provide for low pressure separation of the air from each blade 21 which is constant along the blade 21 despite the radial variation in the air velocity, each blade is twisted along its length to be more steeply inclined to the incident air at the radially innermost portion of the blade than at the radially outermost portion of the blade. The angle $\alpha$ which each deflector blade 21 makes with the disk surface with which it cooperates thus varies along the length of the blade 21 and it can be shown that for constant low pressure separation of the air from the blade 21 the variation in the angle $\alpha$ should follow the relation $$\alpha_x = \mathrm{Sin}^{-1}\, Vm_1{}^2 \,\mathrm{Sin}\, \alpha_1 / Vm_x{}^2$$

where $\alpha_x$ is the value of the angle $\alpha$ at any radial point $x$ along the deflector blade, $Vm_x$ is the mean velocity of the air approaching the deflector blade at the point $x$, $\alpha_1$ is the value of the angle $\alpha$ at the radially outermost point of the deflector blade and $Vm_1$ is the value of the mean velocity of the air approaching the deflector blade at the radially outermost point of the deflector blade.

What is claimed is:

1. In a data storage apparatus having a housing and an information storage member in the form of a magnetizable disk within the housing, the disk being so rotatable within the housing as to entrain air to flow therewith, the improvement comprising at least one air deflector blade mounted within the housing, the deflector blade being operable so to intercept the path of air entrained by the disk as to create a region of turbulence in the air downstream of the deflector blade and to deflect air incident against the deflector blade to pass between the deflector blade and the disk surface into the turbulent region.

2. Apparatus according to claim 1 wherein at least one deflector blade is mounted on each side of the disk.

3. Apparatus according to claim 1 wherein the deflector blade extends radially of the disk, and is shaped to subtend an angle with the surface of the disk which decreases with radial distance from the center of the disk.

4. Apparatus according to claim 1 wherein the disk is movable within the housing to engage clamping means for clamping the disk or releasing the disk from clamping for rotation within the housing, at least one deflector blade being movable between an inoperative position when the disk is clamped and an operative position when the disk is released for rotation.

5. Apparatus according to claim 4 wherein the housing is adapted to receive a removable drive spindle for the disk.

6. Apparatus according to claim 2 wherein the disk is fixed on a drive spindle and both deflector blades are fixed in position.

7. In a data storage system comprising at least one information storage member in the form of a disk, the disk being rotatable about a spindle as to entrain air to flow therewith, the improvement comprising at least one air deflector means being operable so as to intercept the path of air entrained by the disk as to create a region of turbulence in the air downstream of the deflector means and to deflect air incident against the deflector means to pass between the deflector means and the disk surface into the turbulent region.

8. Apparatus of claim 7 wherein the deflector means is a deflector blade.

9. Apparatus according to claim 8 wherein at least one deflector blade is operable on each side of the disk.

10. Apparatus according to claim 8 wherein the deflector blade extends radially of the disk, and is shaped to subtend an angle with the surface of the disk which decreases with radial distance from the center of the disk.

11. Apparatus according to claim 7 wherein the disk is a magnetizable disk.

* * * * *